Aug. 4, 1959 W. BYERS, JR 2,897,963
FLOOR AND CAR MAT
Filed Oct. 2, 1956
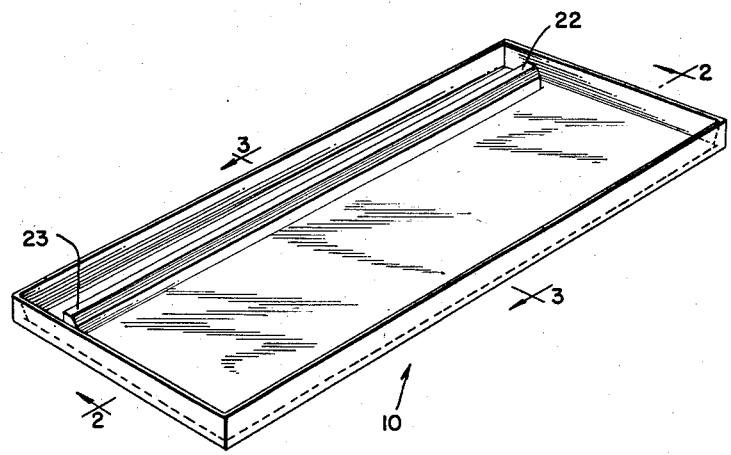
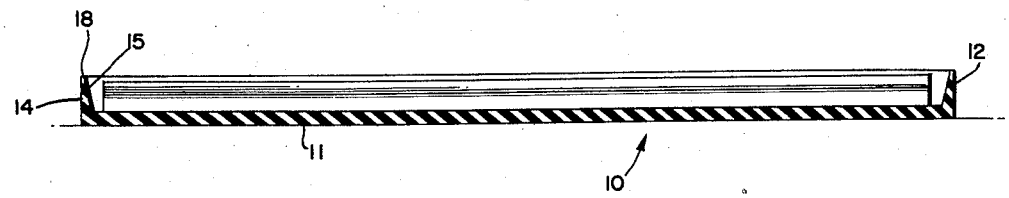
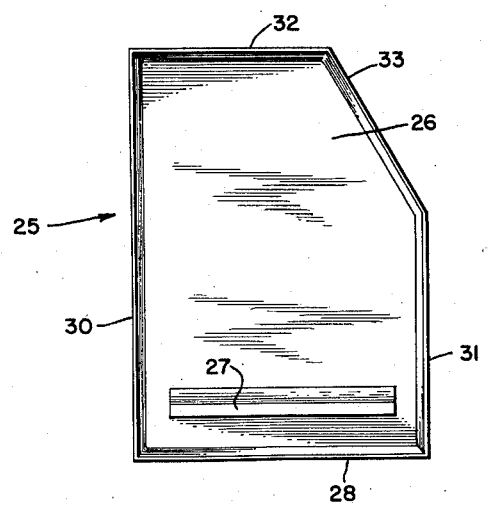
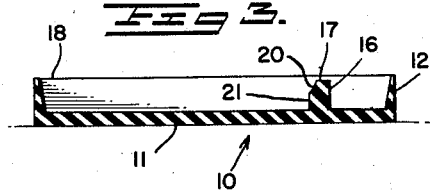
INVENTOR
WHITMAN BYERS, Jr.
BY Gustave Miller
ATTORNEY

United States Patent Office 2,897,963
Patented Aug. 4, 1959

2,897,963

FLOOR AND CAR MAT

Whitman Byers, Jr., Washington, D.C.

Application October 2, 1956, Serial No. 613,581

1 Claim. (Cl. 206—72)

This invention relates to a car and floor mat, and has for an object to provide an improved mat which will protect the floors of homes and floor coverings of automobiles from wet, muddy, and snowy shoes or overshoes by providing a mat which will hold the footwear with one end slightly elevated so as to drain mud, snow, or water off of the footwear.

A further object of this invention is to provide a floor mat that may be integrally molded from a plastic material, including not only the well-known so-called "plastics" but also rubber, either natural or synthetic, or other rubber-like or plastic materials, and may preferably be made in a single piece.

A further object of this invention is to provide a floor mat that can be shaped specially for use in an automobile or other vehicle either the front or rear seat thereof, and also can be used interchangeably in the home for the purpose of providing a place for draining water, mud, or snow off of footwear such as shoes, or overshoes, boots or other types of footwear, by providing means for supporting the footwear with the heel elevated, to not only only drain the foot wear, but also to collect the drainage so that it will not soil the floor covering of the automobile or the floor of the home.

With the foregoing and other subjects in view, as will hereinafter become apparent, this invention comprises the construction, combination and arrangement of parts hereinafter set forth, claimed and disclosed in the accompanying drawing, wherein:

Fig. 1 is a perspective view of the car and floor mat of this invention.

Fig. 2 is a sectional view on line 2—2 of Fig. 1.

Fig. 3 is a sectional view on line 3—3 of Fig. 1.

Fig. 4 shows a modified shape of a floor mat particularly intended for the use of the passenger seated beside the driver of an automobile.

There is shown at 10 the floor mat of this invention intended for use either in the home or in an automobile, particularly for use of the passengers of the rear seat of an automobile. This floor mat 10 is shown as being substantially rectangular in outline and has a body portion 11 of sufficient thickness to give it substantial rigidity yet at the same time providing some flexibility due to inherent inflexibility of the material, the material being either natural or synthetic rubber or rubber composition or any other suitable plastic material including the well-known popular types of plastics.

Integrally molded with the body 11 of the floor mat 10 is a border 12 extending upwardly from all edges of the body 11. It will be noted that the border 12 is substantially rectangular on its outer wall 14 and tapers toward a somewhat thin edge at its top as a result of the inner wall 15 slanting upwardly and outwardly from the body 11, and the thickness of this border 12 is less than the thickness of the body 11.

As will be observed the mat 10 in this form is substantially rectangular being of a width slightly greater than the length of average footwear, and being of a length as long as desired when used in the home, and of a length not greater than the available space when used on the floor covering adjacent the rear seat of an automobile.

Integrally extending upwardly from the body 11 adjacent one long border 12 is a thick rib 16 having a flat-top edge 17 slightly lower than the top edge 18 of the border 12. On the side away from the adjacent border 12 there is provided a bevelled edge 20 connecting the top edge 17 to a vertical wall 21. This rib 16 terminates at ends 22 and 23 slightly spaced from the end borders 12 extending along the short sides of the rectangle of the body 11.

As above pointed out, the short width of the mat 10 is slightly longer than that of average footwear, and in operation, the foot wear is placed with its heel resting over the top edge 17 and bevelled edge 20 of the rib 16 and its toe extending toward the border more distant therefrom. As a result, the footwear such as shoes, overshoes, boots and so forth, will be supported at an incline and any mud, water, or snow thereon will drain off the footwear unto the body 11, which body 11, together with its surrounding border 12 provides a receptacle for retaining all drainage until such time as it can be disposed of safely.

Obviously, the mat shown in Figs. 1, 2, and 3 can be used anywhere in the home for the purpose of protecting the floors of the home and can without any change in shape but by merely being of an appropriate size be used for the rear passengers of an automobile to protect the floor covering, with the passengers resting their heels on the rib 16 and having their toes extending onto the body 11 of the mat 10 within the border 12.

In Fig. 4 there is shown a car floor mat 25 shaped particularly for use of the passenger sitting beside the driver of the automobile, and consists of a body 26 having a rib 27 substantially identical with the rib 16 spaced from an adjacent border 28 and having its ends terminating short of side borders 30 and 31. A border 32 is provided opposite and parallel to the border 28 just as the border 31 is opposite and parallel to border 30, but borders 31 and 32 are connected by an angular edge of the body 26 provided with a border 33 and thus provides a shape that will fit comfortably in the area provided for the passenger sitting beside the driver of the automobile. The operation of this car mat 25 is, of course, identical with that previously described, the passenger rests his heels on the rib 27 and the soles or the toes of his footwear on the body 26, and the drainage will collect on the body 26, while the heels remain elevated on the rib 27, flowing behind the rib 27 if there is any tilt in the automobile floor and remaining there safely until it can be disposed of.

While the preferred form of this invention has been shown and described, it will be understood that this invention is not restricted to the particular details of construction and arrangement hereinbefore set forth but that changes in such deails of construction may be made within the scope of what is hereinafter claimed.

Having thus set forth and disclosed the nature of this invention, what is claimed is:

As a new article of manufacture, a car and floor mat made of substantially rigid plastic material comprising a substantially flat body, said body being of a substantially uniform thickness throughout its area, said body being substantially rectangular in shape, and having one corner cut away to conform to the interior configuration of a car floor, a raised border integral with said body and extending entirely about said body, said border being tapered and of less thickness than the thickness of said body, and an integral upstanding rib, slightly less in height than the height of said border, and of substantially greater thickness than the thickness of said border or of body, said rib extending parallel to but slightly spaced from an adjacent side border of said body and greatly spaced from the border opposite said adjacent border, the distance from said rib to said border opposite said adjacent border being of a length to provide a flat space sufficient to contain an average size shoe, the ends of said rib being slightly spaced from the adjacent borders of said body, said rib having a bevelled upper edge on the side toward said opposite border, whereby an article of footwear may be supported with the heel portion thereof supported on said rib and the sole portion thereof supported on said body within said border to thereby drain any moisture from the footwear, the drainage being confined on the body by said border, the spacing of the ends of the rib from the side borders permitting free flow of drained fluid to the adjacent edge of the body regardless of the angle of inclination of the car.

References Cited in the file of this patent
UNITED STATES PATENTS

| | | |
|---|---|---|
| 918,396 | Tracy | Apr. 13, 1909 |
| 1,398,701 | MacPherson | Nov. 29, 1921 |
| 1,711,412 | Hines | Apr. 30, 1929 |
| 1,941,922 | Worth | Jan. 2, 1934 |
| 2,044,407 | Smith | June 16, 1936 |
| 2,604,377 | Eames | July 22, 1952 |
| 2,659,485 | Duley | Nov. 17, 1953 |